(12) United States Patent
Kwon et al.

(10) Patent No.: US 8,605,751 B2
(45) Date of Patent: Dec. 10, 2013

(54) SYMBOL MAPPING APPARATUS AND METHOD

(75) Inventors: DongSeung Kwon, Daejeon (KR);
Byung-Jae Kwak, Seoul (KR);
Bum-Soo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 190 days.

(21) Appl. No.: 13/061,371

(22) PCT Filed: Aug. 28, 2009

(86) PCT No.: PCT/KR2009/004826
§ 371 (c)(1),
(2), (4) Date: Feb. 28, 2011

(87) PCT Pub. No.: WO2010/024619
PCT Pub. Date: Mar. 4, 2010

(65) Prior Publication Data
US 2011/0158257 A1    Jun. 30, 2011

(30) Foreign Application Priority Data

Aug. 28, 2008 (KR) .................. 10-2008-0084303
Aug. 11, 2009 (KR) .................. 10-2009-0073941

(51) Int. Cl.
*H04J 3/24* (2006.01)
(52) U.S. Cl.
USPC ................... 370/474; 370/335; 370/342
(58) Field of Classification Search
USPC .................................. 370/474, 342, 335
See application file for complete search history.

(56) References Cited

U.S. PATENT DOCUMENTS

| | | | |
|---|---|---|---|
| 6,892,341 B2 | 5/2005 | Golitschek et al. | |
| 7,496,079 B2 | 2/2009 | Kim et al. | |
| 2002/0191643 A1 | 12/2002 | Yun et al. | |
| 2002/0199147 A1 | 12/2002 | Kim et al. | |
| 2003/0007476 A1* | 1/2003 | Kim et al. | 370/342 |
| 2003/0072292 A1* | 4/2003 | Yoon et al. | 370/342 |
| 2003/0120990 A1 | 6/2003 | Elbwart et al. | |
| 2005/0193307 A1 | 9/2005 | Wengerter et al. | |
| 2005/0204251 A1 | 9/2005 | Moon et al. | |
| 2008/0049859 A1* | 2/2008 | Choi et al. | 375/261 |
| 2008/0225970 A1 | 9/2008 | Kim et al. | |
| 2009/0276671 A1* | 11/2009 | Fang et al. | 714/748 |

FOREIGN PATENT DOCUMENTS

| | | |
|---|---|---|
| CN | 1395387 A | 2/2003 |
| JP | 2002-359882 | 12/2002 |
| JP | 2003-101520 | 4/2003 |
| JP | 2003-143041 | 5/2003 |
| JP | 3480846 | 12/2003 |
| KR | 10-2004-0053323 | 6/2004 |

(Continued)

OTHER PUBLICATIONS

Ch. Wengerter et al., "Advanced Hybrid ARQ Technique Employing a Signal Constellation Rearrangement"; Proceedings of IEEE Vehicular Technology Conference; 2002 IEEE 56th vol. 4; pp. 2002-2006; Sep. 2002).

(Continued)

*Primary Examiner* — Hassan Kizou
*Assistant Examiner* — Hashim Bhatti
(74) *Attorney, Agent, or Firm* — Staas & Halsey LLP

(57) ABSTRACT

In a symbol mapping apparatus, a channel coder outputs a codeword including a plurality of information bits and a plurality of redundancy bits by encoding transmission data. A symbol mapper maps the codeword to the symbol while changing a mapping scheme in the unit of the codeword.

11 Claims, 6 Drawing Sheets

(56) References Cited

FOREIGN PATENT DOCUMENTS

| KR | 10-2008-0084456 | 9/2008 |
|---|---|---|
| WO | 02/067491 | 8/2002 |
| WO | 2006/119794 | 11/2006 |
| WO | 2007/021122 | 2/2007 |

OTHER PUBLICATIONS

Hyungho Park, et al., "Constellation Rearrangement for IEEE 802.16m HARQ"; pp. 1-7; Jul. 2008.

Katsumi Sakakibara et al., "An Incremental Redundancy Hybrid ARQ Scheme Using Punctured MDS Codes for Frequency-Hopping Channels", IEEE $7^{th}$ Symposium on Spread Spectrum Techniques and Applications, Sep. 2-5, 2002, pp. 88-92.

International Search Report for PCT/KR2009/004826, mailed Feb. 16, 2010.

"Interleaving for LTE Shared Channels", R1-073669; Nokia Siemens Networks, Nokia, 3GPP TSG-RAN WG1 #50, Aug. 20, 2007.

* cited by examiner

Fig. 9
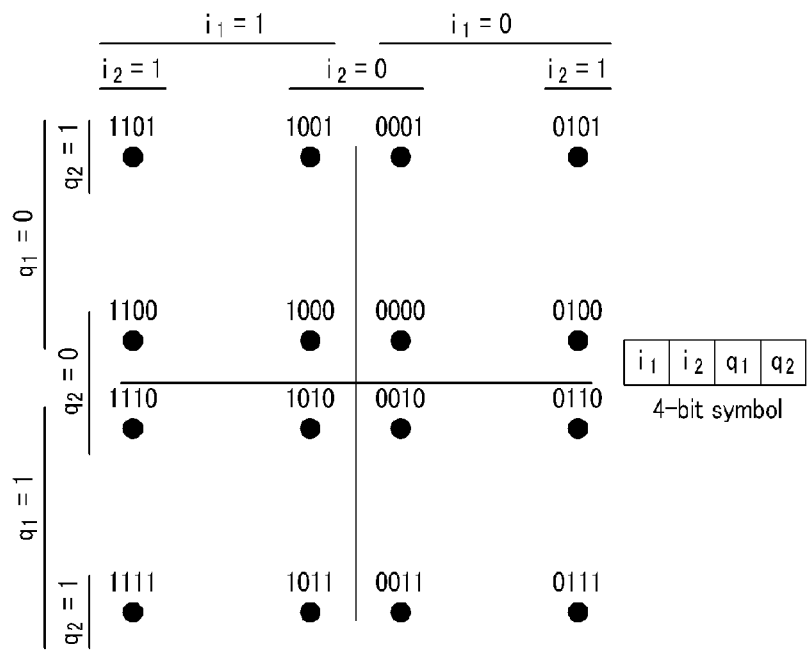
Fig. 10
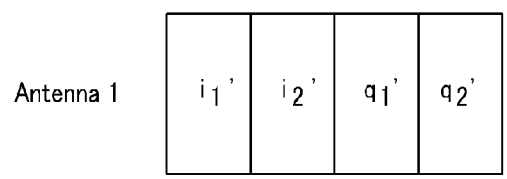
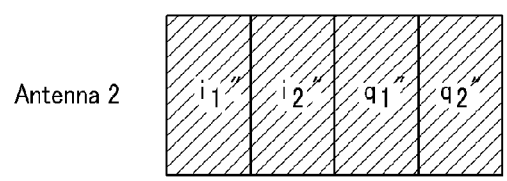
Fig. 11
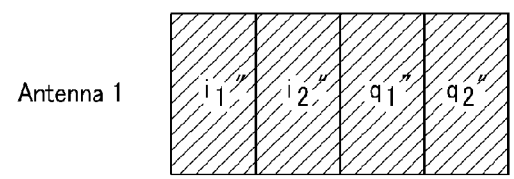
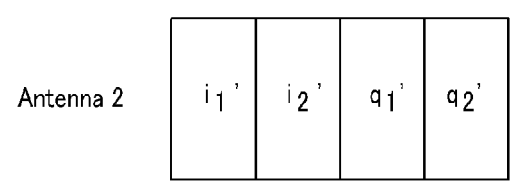

SYMBOL MAPPING APPARATUS AND METHOD

CROSS REFERENCE TO RELATED APPLICATIONS

This application claims the benefit under 35 U.S.C. Section 371, of PCT International Application No. PCT/KR2009/004826, filed Aug. 28, 2009, which claimed priority to Korean Application No. 10-2008-0084303, filed Aug. 28, 2008 and Korean Application No. 10-2009-0073941, filed Aug. 11, 2009, the disclosures of which are hereby incorporated by reference.

TECHNICAL FIELD

The present invention relates to a symbol mapping apparatus and a symbol mapping method.

BACKGROUND ART

When information bits are encoded by a channel coder, the channel coder outputs a codeword including the information bits and redundancy bits added to the information bits. An example of the channel coder is a systematic channel coder such as a convolutional turbo code (CTC).

Among modulation methods, quadrature amplitude modulation (QAM) is a modulation method that converts multiple bits of transmission data into information of phase and amplitude of one symbol, and transmits the bits. A 16-QAM method can transmit 4 bits with one symbol and a 64-QAM method can transmit 6 bits with one symbol.

For example, the 16 QAM divides data to be transmitted into 4-bit units, mapping each of the units to one of 16 symbols, modulating them, and transmitting them, and it generally uses the gray mapping for the symbol mapping method. When the 4-bit symbol that is modulated by the gray mapping is received, the bits of the received symbol respectively have different reliability. For example, the reliability of the received bits can be shown as log likelihood ratio (LLR) values. Performance of the received symbol, for example a block error rate (BLER), may vary depending on how the codeword is mapped in the symbol due to the difference in reliability.

Further, in the wireless communication system, when a transmitted packet is not normally received in a receiver, a method for retransmitting the corresponding packet is used. The retransmission method includes, for example, a hybrid automatic repeat request (HARQ). In the retransmission method, reliability should be considered in order to improve performance of the received packet.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

Aspects of the present invention provide a symbol mapping method and a symbol mapping apparatus for improving reception performance.

Solution to Problem

An aspect of the present invention provides a method for mapping transmission data to symbols in a symbol mapping apparatus. This method includes: outputting a codeword by encoding the transmission data; mapping the codeword to the symbols in accordance with a first mapping scheme for first transmission; and mapping the codeword to the symbol in accordance with a second mapping scheme different from the first mapping scheme for second transmission.

Reliability of a bit to which any one bit of the codeword is mapped in accordance with the first mapping scheme is different from reliability of a bit to which the one bit is mapped in accordance with the second mapping scheme.

Any one bit of the codeword may be mapped to a first bit of the symbol in accordance with the first mapping scheme and mapped to a second bit of the symbol in accordance with the second mapping scheme. In this case, a position of the first bit may be different from a position of the second bit within a symbol, or a constellation point of a constellation used in the second mapping scheme may be shifted with respect to a constellation point of a constellation used in the first mapping scheme.

The second transmission may be retransmission in accordance with an incremental redundancy hybrid automatic repeat request (IR-HARQ).

Another aspect of the present invention provides an apparatus for mapping a symbol that includes a channel coder and a symbol mapper. The channel coder outputs a codeword by encoding transmission data, and the symbol mapper maps the codeword to the symbol and maps the codeword to the symbol while changing a mapping scheme in the unit of the codeword in retransmission.

Yet another embodiment of the present invention provides a method for mapping transmission data to symbols in a symbol mapping apparatus. This method includes: outputting transmission bits by encoding the transmission data; storing the transmission bits in a circular buffer; reading the transmission bits from the circular buffer and mapping the read bits to the symbol; and changing a mapping scheme in which the read bits are mapped to the symbol whenever reading the transmission bit at the end of the circular buffer again.

BRIEF DESCRIPTION OF DRAWINGS

FIGS. 6 to 11 schematically show a BSM scheme according to an embodiment of the present invention.

MODE FOR THE INVENTION

Figure 1:
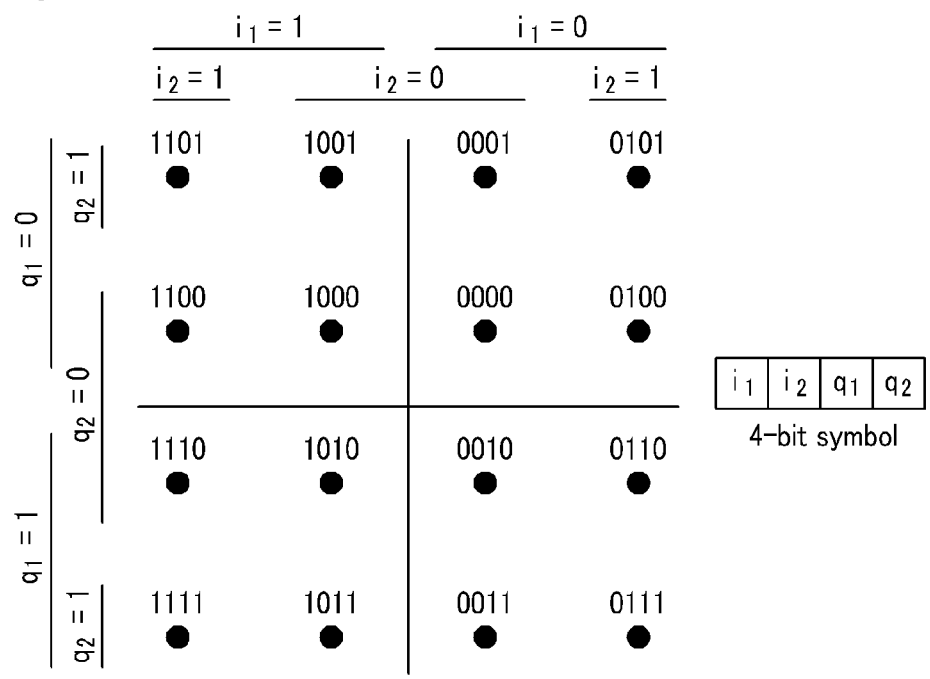
FIG. 1 shows one example of 16-QAM gray mapping.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

First, reliability of each bit in a symbol at the time of modulating transmission data will be described with reference to FIG. 1.

FIG. 1 shows one example of 16-QAM gray mapping. FIG. 1 will use 16 QAM as an example of modulation method, gray mapping as an example of symbol mapping, and LLR as an example of reliability.

Referring to FIG. 1, in the gray mapping, 1 bit value is different between adjacent symbols and other bit values are the same. A plurality of gray mappings may be present for one 16-QAM constellation, and FIG. 1 shows one example of the plurality of gray mappings. Four bits are positioned in the order of $i_1$, $i_2$, $q_1$, and $q_2$ in the symbol of FIG. 1

In this case, an average LLR value of the first bit $i_1$ of bits mapped with an in-phase component is larger than an average LLR value of the second bit $i_2$, and an average LLR value of the first bit $q_1$ of bits mapped with a quadrature component is larger than an average LLR value of the second bit $q_2$. Therefore, in FIG. 1, among the four bit symbols, the first and third bits $i_1$ and $q_1$ have higher reliability than the second and fourth bits $i_2$ and $q_2$.

In the symbol mapping method such as the gray mapping, since the reliability of each bit may vary depending on the position of each bit, reception performance such as block error rate of a transmitted packet may be influenced depending on a method of mapping bits of a codeword that is an output of a channel coder to the symbol (bit-to-symbol mapping, hereinafter referred to as "BSM"). An embodiment that can improve the reception performance such as the block error rate will be described below with reference to FIGS. 2 to 11.

Figure 2:
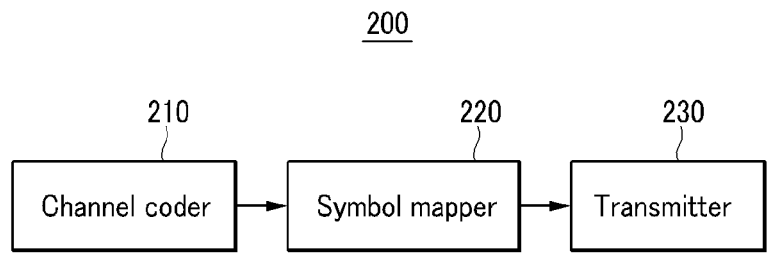
FIG. 2 is a schematic block diagram of a symbol mapping apparatus according to an embodiment of the present invention.
Figure 3:
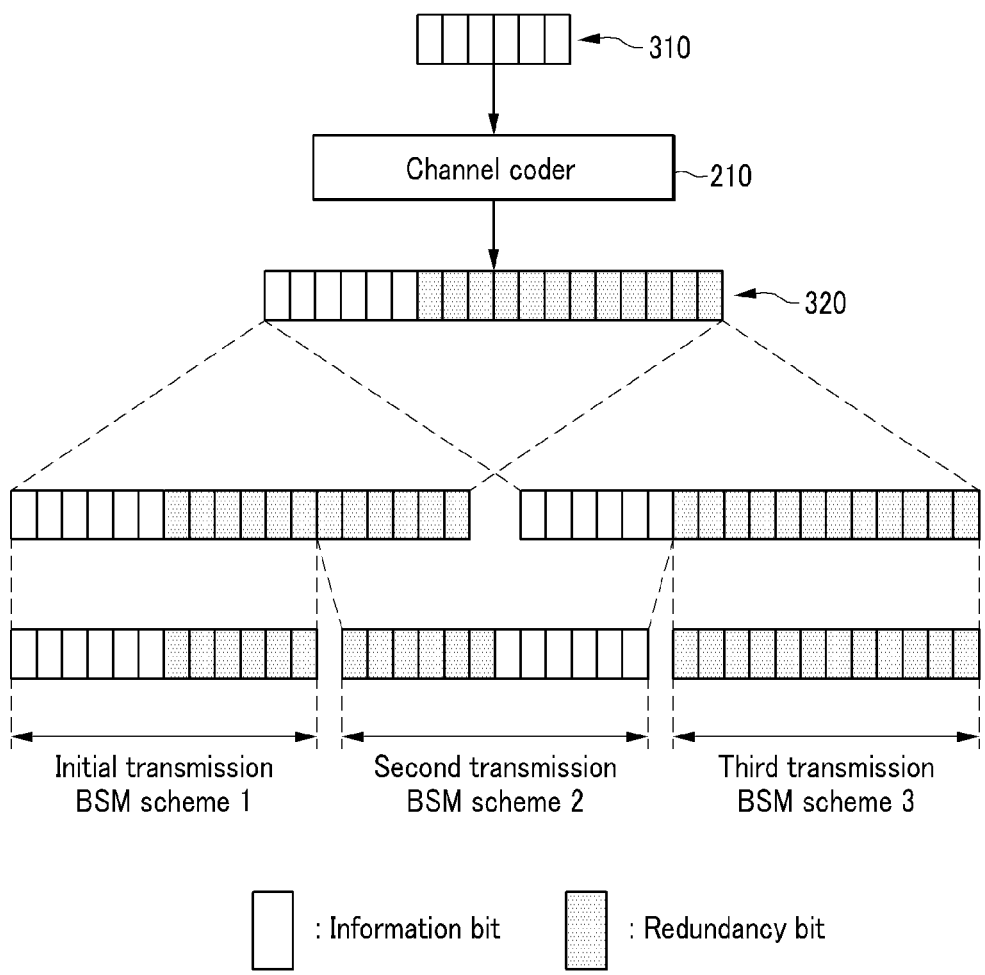
FIGS. 3 and 4 are schematic diagrams of a symbol mapping method according to an embodiment of the present invention.
Figure 4:
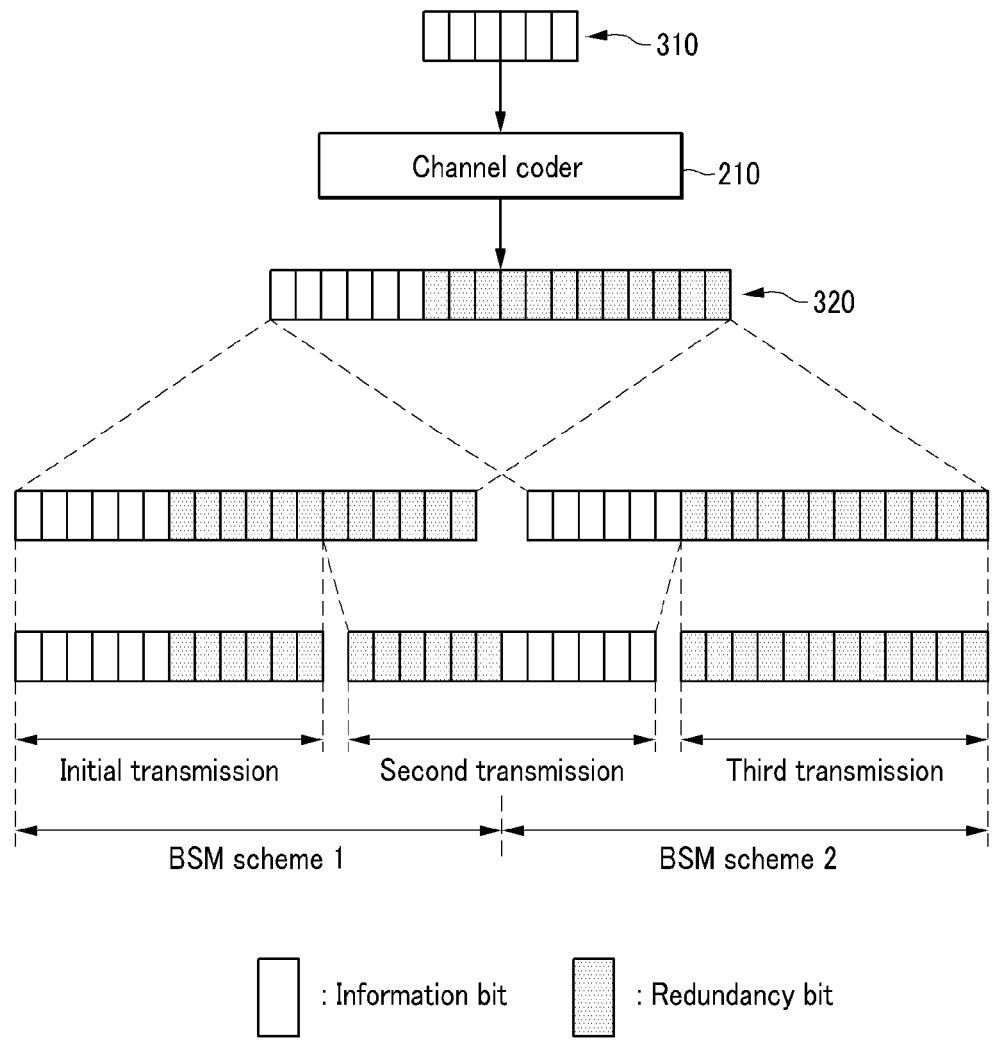
Figure 5:
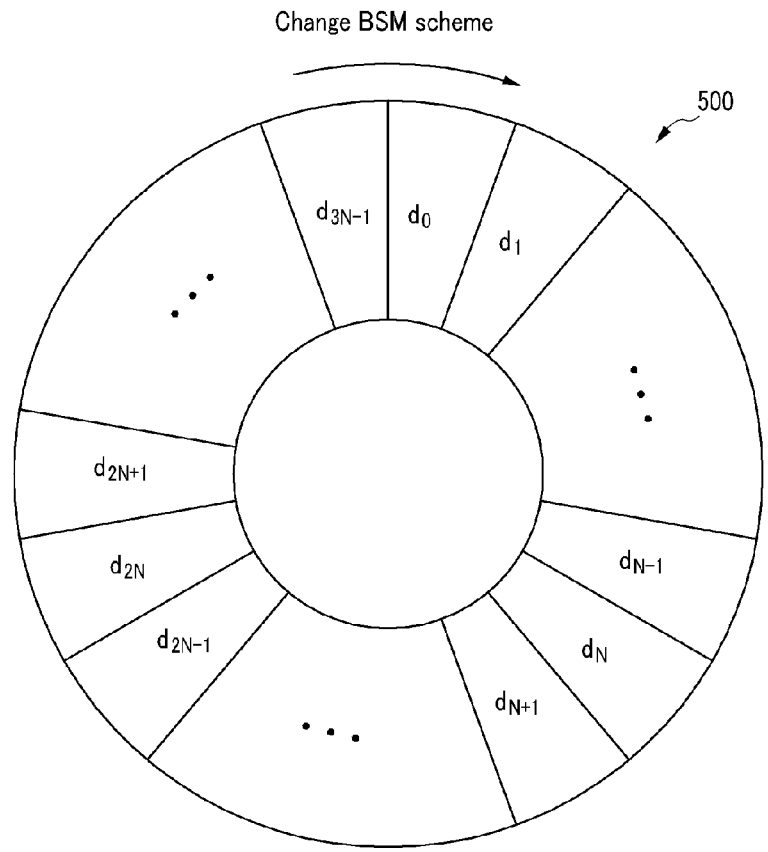
FIG. 5 schematically shows a circular buffer according to an embodiment of the present invention.

FIG. 2 is a schematic block diagram of a symbol mapping apparatus according to an embodiment of the present invention, and FIGS. 3 and 4 are schematic diagrams of a symbol mapping method according to an embodiment of the present invention. FIG. 5 schematically shows a circular buffer according to an embodiment of the present invention.

In FIGS. 2 to 4, a case in which encoding rate is ⅓ and a length of a transmission block, that is, a transmitted packet, is twice that of information bits is exemplified for convenience of description.

Referring to FIG. 2, a symbol mapping apparatus 200 includes a channel coder 210, a symbol mapper 220, and a transmitter 230.

Referring to FIG. 3, first, the channel coder 210, for example a systematic channel coder, encodes transmitted data 310. Therefore, the channel coder 210 outputs a codeword 320 including information bits and redundancy bits added to the information bits. The information bits are the same bits as transmitted data before encoding, and the redundancy bits are bits including redundancy information on the transmitted data. Assuming the coding rate of the channel coder 210 is ⅓, the codeword 320 that is the output of the channel coder 210 has a length three times that of the information bits 310.

The symbol mapper 220 maps bits corresponding to the length of the transmission block in the codeword 320 to symbols in one BSM scheme (hereinafter referred to as "BSM scheme 1") for initial transmission, and the transmitter 230 transmits the transmission block including the mapped symbols to a receiver (the initial transmission). Meanwhile, before the symbol mapper 220 maps the symbol, at least some of the information bits and the redundancy bits may be punched, and further, the information bits and the redundancy bits may be interleaved.

When a negative acknowledge (NAK) is received from the receiver after the initial transmission, the transmitter 230 retransmits the redundancy bits that have not been transmitted in the initial transmission among the codeword 320. As the retransmission method, an IR-HARQ may be used. Meanwhile, when the length of the redundancy bits to be transmitted in the second transmission is shorter than the length of the transmission block, the information bits of the codeword 320 may be transmitted in addition to the redundancy bits. For this, in the second transmission, the symbol mapper 220 maps bits (some of the redundancy bits of the codeword 320 and the information bits of the codeword 320 in FIG. 3) corresponding to the length of the transmission block to the symbols in another BSM scheme (hereinafter, referred to as "BSM scheme 2") and the transmitter 230 transmits the transmission block including the mapped symbols to the receiver.

When the NAK is received from the receiver after the second transmission, the transmitter 230 retransmits the redundancy bits that have not been transmitted in the second transmission among the codeword 320. For this, in the third transmission, the symbol mapper 220 maps bits (the redundancy bits of the codeword 320 in FIG. 3) corresponding to the length of the transmission block to the symbols in another BSM scheme (hereinafter referred to as "BSM scheme 3"), and the transmitter 230 transmits the transmission block including the mapped symbols to the receiver.

In this case, the receiver restores the information bits by using all the bits received in the initial transmission and the retransmission. The symbol mapper 220 sets the BSM schemes 1 to 3 so as to improve the reception performance in the receiver. For this, the symbol mapper 220 may set the BSM schemes 1 and 2 so that the BSM scheme 2 complements the BSM scheme 1. For example, when any symbol is mapped and transmitted in the BSM scheme 1 at one time and mapped and transmitted in the second BSM scheme 2 at another time, the symbol mapper 220 may set the BSM schemes 1 and 2 for excellent reception performance. In addition, the symbol mapper 220 may set the BSM scheme 3 so as to acquire a maximum diversity gain when symbols received by being mapped in the BSM schemes 1 and 2 are combined with symbols received by being mapped in the BSM scheme 3. In this case, since the BSM scheme 2 is set to be optimized to the BSM scheme 1, complementarity between the BSM scheme 2 and the BSM scheme 3 is inferior to complementarity between the BSM scheme 1 and the BSM scheme 3 and complementarity between the BSM scheme 1 and the BSM scheme 2. Therefore, as shown in FIG. 3, in the redundancy bits transmitted by being mapped in the BSM scheme 2 in the second transmission and mapped in the BSM scheme 3 in the third transmission, the diversity gain is inferior to other bits.

Meanwhile, referring to FIG. 4, the symbol mapper 220 changes the BSM scheme in the unit of the codeword 320, unlike the embodiment shown in FIG. 3, which changes the BSM scheme in the unit of transmission. That is, the symbol mapper 220 maps the codeword 320 to the symbols in the BSM scheme 1 at one time and maps the codeword 320 to the symbols in the BSM scheme 2 at another time.

For this, as shown in FIG. 5, the symbol mapper 220 may change the BSM scheme whenever reading codeword $d_0$, $d_1, \ldots, d_{N-1}, d_N, d_{N+1}, \ldots, d_{2N-1}, d_{2N}, d_{2N+1}, \ldots, d_{3N-1}$ at the end of a circular buffer 510 after storing the codeword $d_0$, $d_1, \ldots, d_{N-1}, d_N, d_{N+1}, \ldots, d_{2N-1}, d_{2N}, d_{2N+1}, \ldots, d_{3N-1}$ to the circular buffer 610.

Therefore, the transmitter 230 transmits the transmission block including information bits and redundancy bits mapped in the BSM scheme 1 to the receiver in the first transmission. When the NAK is received from the receiver after the initial transmission, the transmitter 230 transmits the transmission block including redundancy bits mapped in the BSM scheme 1 and information bits mapped in the BSM scheme 2 to the receiver. When the NAK is received from the receiver after the second transmission, the transmitter 230 transmits the transmission block including redundancy bits mapped in the BSM scheme 2.

In this case, since all the bits of the codeword 320 are transmitted by being mapped in the BSM scheme 1 at one time and by being mapped in the BSM scheme 2 at another time, the BSM scheme 1 and the BSM scheme 2 complement each other, thereby improving the reception performance such as the block error rate, the diversity gain.

The symbol mapper 220 allocates a bit allocated to a bit having low reliability in the BSM scheme 1 to a bit having higher reliability in the BSM scheme 2, and allocates a bit allocated to a bit having high reliability in the BSM scheme 1 to a bit having lower reliability in the BSM scheme 2 to thereby complement the BSM scheme 1 and the BSM scheme 2 with each other. Hereinafter, the embodiment in which the BSM scheme 1 and the BSM scheme 2 complement each other will be described in detail with reference to FIGS. 6 to 9.

Figure 6:
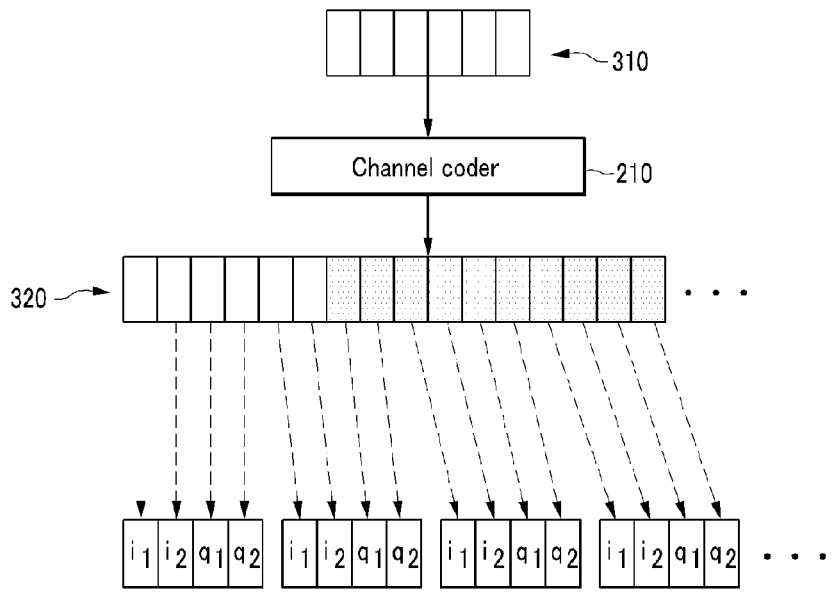
Figure 7:
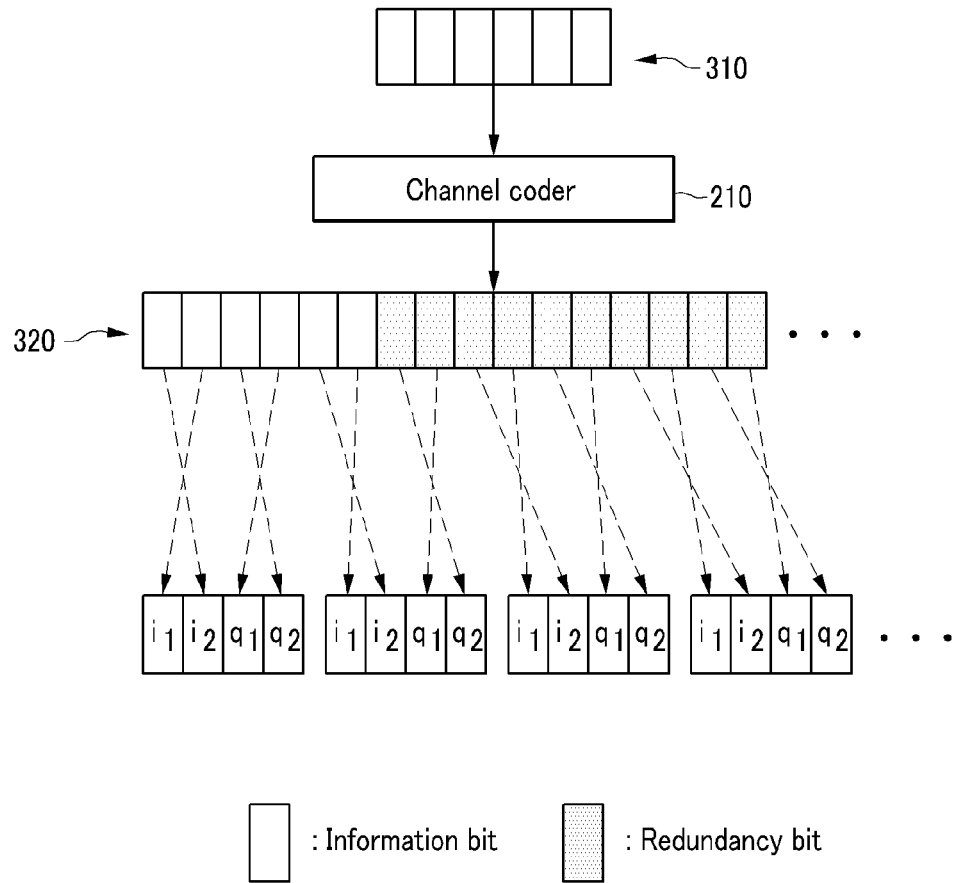

FIGS. 6 and 7 schematically show a BSM scheme according to an embodiment of the present invention. In FIGS. 6 and 7, it is assumed that the gray mapping of 16-QAM shown in FIG. 1 is used.

Referring to FIG. 6, the symbol mapper 220 sequentially maps the bits of the codeword 320 to four bits $i_1$, $i_2$, $q_1$, and $q_2$ of the symbol. Accordingly, odd numbered bits of the codeword 320 are mapped to the $i_1$ and $q_1$ bits and even numbered bits of the codeword 320 are mapped to the $i_2$ and $q_2$ bits. That is, the symbol mapper 220 maps the odd numbered bits to the bits having higher reliability than the even numbered bits.

Referring to FIG. 7, the symbol mapper 220 maps the bits mapped to $i_1$ and $q_1$ bits in FIG. 6 to the $i_2$ and $q_2$ bits, and maps the bits mapped to the $i_2$ and $q_2$ bits in FIG. 6 to $i_1$ and $q_1$ bits. Accordingly, the odd numbered bits of the codeword 320 are mapped to the $i_2$ and $q_2$ bits and the even numbered bits of the codeword 320 are mapped to $i_1$ and $q_1$ bits. That is, the symbol mapper 220 maps the even numbered bits to the bits having higher reliability than the odd numbered bits.

As a result, the symbol mapper 220 maps the codeword in one of the BSM schemes shown in FIGS. 6 and 7 at one time and maps the codeword in the other of the BSM schemes shown in FIGS. 6 and 7 at another time. Therefore, the symbol mapper 220 can map the bit mapped to the bit having higher reliability to the bit having lower reliability in the retransmission, and map the bit mapped to the bit having low reliability to the bit having higher reliability in the retransmission.

Figure 8:
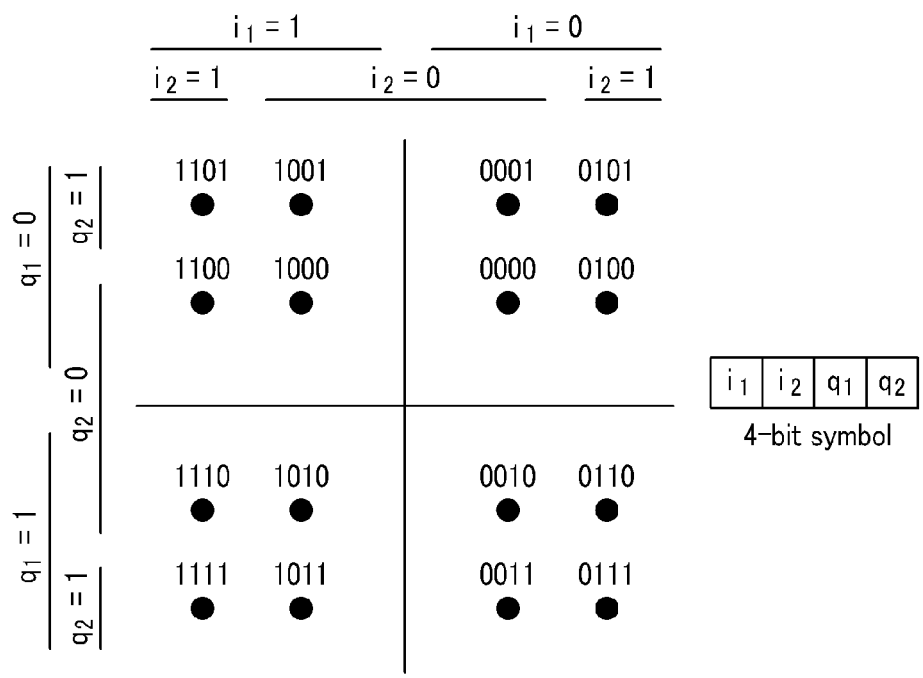

FIGS. 8 and 9 schematically show a BSM scheme according to another embodiment of the present invention. In FIGS. 8 and 9, it is assumed that the gray mapping of 16-QAM is used.

Referring to FIGS. 8 and 9, the symbol mapper 220 maps the codeword to the symbol by using a constellation applying a constellation shift to the constellation shown in FIG. 1.

Referring to FIG. 8, the symbol mapper 220 adopts the constellation shift in a form in which four constellation points meet at the center on each quadrant of the constellation. Therefore, since a distance between two symbols having $i_1$ or $q_1$ bits having different values is extended and a distance between two symbols having $i_2$ or $q_2$ bits having different values is shortened, the reliabilities of the $i_1$ and $q_1$ bits are higher than those of FIG. 1 and the reliabilities of $i_2$ and $q_2$ bits are lower than those of FIG. 1.

Referring to FIG. 9, the symbol mapper 220 adopts the constellation shift in a form in which four constellation points are estranged from the center on each quadrant of the constellation. Therefore, since the distance between two symbols having $i_1$ or $q_1$ bits having different values is shortened and the distance between two symbols having $i_2$ or $q_2$ bits having different values is extended, the reliabilities of the $i_1$ and $q_1$ bits are lower than those of FIG. 1 and the reliabilities of $i_2$ and $q_2$ bits are higher than those of FIG. 1.

As a result, the symbol mapper 220 maps the codeword in a BSM scheme using one of the constellations shown in FIGS. 8 and 9 at one time, and maps the codeword in a BSM scheme using the other of the constellations shown in FIGS. 8 and 9 at another time. Therefore, the symbol mapper 220 can map the bit mapped to the bit having higher reliability to the bit having lower reliability in the retransmission, and map the bit mapped to the bit having low reliability to the bit having higher reliability in the retransmission.

FIGS. 10 and 11 schematically show a BSM scheme according to another embodiment of the present invention.

Referring to FIGS. 10 and 11, the transmitter 230 includes a plurality of antennas (antenna 1 and antenna 2).

Referring to FIG. 10, the symbol mapper 220 maps some bits $i_1'$, $i_2'$, and $q_2'$ of the codeword to bits to be transmitted through the antenna 1 of the plurality of antennas, and maps other some bits $i_1''$, $i_2''$, $q_1''$, and $q_2''$ of the codeword to bits to be transmitted through the antenna 2 of the plurality of antennas.

Referring to FIG. 11, the symbol mapper 220 maps the bits $i_1'$, $i_2'$, $q_1''$, and $q_2'$ of the codeword transmitted through the antenna 1 in FIG. 10 to the bits to be transmitted through the antenna 2, and maps the bits $i_1''$, $i_2''$, $q_1''$, and $q_2''$ of the codeword transmitted through the antenna 2 in FIG. 10 to the bits to be transmitted through the antenna 1.

As a result, the symbol mapper 220 can map the codeword in one of the BSM schemes shown in FIGS. 10 and 11 at one time, and map the codeword in the other of the BSM schemes shown in FIGS. 10 and 11 at another time. Therefore, since the bits transmitted through the antenna 1 are transmitted through the antenna 2 in the next transmission, it is possible to acquire a spatial diversity gain.

As such, in the symbol mapping apparatus 200 according to the embodiment of the present invention, each bit of the codeword in the initial transmission and each bit of the codeword in the retransmission complement each other by changing the BSM scheme in the unit of the codeword, such that it is possible to improve the reception performance such as the block error rate, the diversity gain. In this case, as the BSM scheme, each of the scheme of changing the mapped bits in the symbol (refer to FIGS. 6 and 7), the scheme of shifting the constellation point of the constellation used to be mapped to the symbol (refer to FIGS. 8 and 9) and the scheme of rearranging the bits between the antennas (refer to FIGS. 10 and 11) may be used, or a combination of at least two schemes among the three schemes may be used.

Meanwhile, in the embodiment of the present invention, although 16-QAM in which four bits per symbol are present has been described as one example, the method for mapping the symbol according to the embodiment of the present invention may be adopted in a modulation scheme (for example $2^{2n}$ QAM) other than 16-QAM.

Further, in the embodiment of the present invention, although the case in which the length of the codeword is three times (3N) that of the length (N) of the information bit has been described as one example, the relationship between the length of the codeword and the length of the information bit is not limited thereto. For example, the length of the codeword may be twice (2N), four times (4N), five times (5N), etc., that of the length (N) of the information bit.

The above-mentioned exemplary embodiments of the present invention are not embodied only by an apparatus and/or method. Alternatively, the above-mentioned exemplary embodiments may be embodied by a program performing functions that correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for mapping transmission data to symbols in a symbol mapping apparatus, the method comprising:
    outputting transmission bits by encoding the transmission data;
    mapping at least part of the transmission bits to symbols in accordance with a first mapping scheme for first transmission; and
    mapping at least part of the transmission bits to symbols in accordance with a second mapping scheme for second transmission, the second mapping scheme being different from the first mapping scheme,
    wherein an input bit is mapped to a first bit of a symbol in accordance with the first mapping scheme and mapped to a second bit of the symbol in accordance with the second mapping scheme,
    wherein the second bit has relatively lower reliability within a symbol when the first bit has relatively higher reliability within the symbol, and
    wherein bits transmitted in the second transmission include a bit mapped in accordance with the first mapping scheme and a bit mapped in accordance with the second mapping scheme.

2. The method of claim 1, wherein a position of the first bit is different from a position of the second bit within the symbol.

3. The method of claim 1, wherein the second transmission is retransmission in accordance with an incremental redundancy hybrid automatic repeat request (IR-HARQ).

4. The method of claim 1, wherein a plurality of bits which are mapped in accordance with the first mapping scheme and the second mapping scheme have the same reliability.

5. The method of claim 1, wherein the transmission bits begins again at the second transmission.

6. A Symbol mapping apparatus, the apparatus comprising:
    a channel coder configured to output a plurality of transmission bits by encoding transmission data; and
    a symbol mapper configured to map at last part of the transmission bits to a symbol and to map at least of the transmission bits to the symbol while changing a mapping scheme when the transmission bits begins again in retransmission,
    wherein an input bit is mapped to a first bit of the symbol in accordance with the first mapping scheme and mapped to a second bit of the symbol in accordance with the second mapping scheme,
    wherein the second bit has relatively lower reliability within the symbol when the first bit has relatively higher reliability within the symbol, and
    wherein bits transmitted in the retransmission include a bit mapped in accordance with the first mapping scheme and a bit mapped in accordance with the second mapping scheme.

7. The apparatus of claim 6, wherein the retransmission is retransmission in accordance with an incremental redundancy hybrid automatic repeat request (IR-HARQ).

8. The apparatus of claim 6, wherein the symbol mapper changes the mapping scheme by using the first mapping scheme and the second mapping scheme.

9. The apparatus of claim 8, wherein a position of the first bit is different from a position of the second bit within the symbol.

10. The apparatus of claim 8, wherein a plurality of bits which are mapped in accordance with the first mapping scheme and the second mapping scheme have the same reliability.

11. A method for mapping transmission data to symbols in a symbol mapping apparatus, the method comprising:
    outputting transmission bits by encoding the transmission data; storing the transmission bits in a buffer; mapping at least part of the transmission bits stored in the buffer to a symbol; and changing a mapping scheme for mapping the transmission bits to a symbol whenever reading the transmission bits at the end of the buffer again,
    wherein an input bit is mapped to a first bit of a symbol in accordance with a first mapping scheme and mapped to a second bit of a symbol in accordance with a second mapping scheme,
    wherein the second bit has relatively lower reliability within a symbol when the first bit has relatively higher reliability within the symbol.

* * * * *